United States Patent
Van Ravestyn et al.

(10) Patent No.: US 10,344,137 B2
(45) Date of Patent: Jul. 9, 2019

(54) POLYOLEFIN-BASED RESIN PRE-EXPANDED PARTICLE, IN-MOLD FOAMED ARTICLE, PROCESS FOR PRODUCING THE POLYOLEFIN-BASED RESIN PRE-EXPANDED PARTICLE, AND PROCESS FOR PRODUCING THE IN-MOLD FOAMED ARTICLE

(71) Applicants: Kaneka Belgium N.V., Westerlo-Oevel (BE); Kaneka Corporation, Osaka (JP)

(72) Inventors: Pierre Van Ravestyn, Geel (BE); Nancy Laeveren, Laakdal (BE)

(73) Assignees: Kaneka Belgium N.V., Westerlo-Oevel (BE); KANEKA CORPORATION, Osaka (JP)

( * ) Notice: Subject to any disclaimer, the term of this patent is extended or adjusted under 35 U.S.C. 154(b) by 0 days.

(21) Appl. No.: 15/475,675

(22) Filed: Mar. 31, 2017

(65) Prior Publication Data
US 2017/0204240 A1  Jul. 20, 2017

Related U.S. Application Data

(63) Continuation of application No. PCT/JP2015/078090, filed on Oct. 2, 2015.

(30) Foreign Application Priority Data

Oct. 3, 2014 (EP) .................... 14187638
Nov. 20, 2014 (EP) .................... 14194126

(51) Int. Cl.
  *C08J 9/16*  (2006.01)
  *C08J 9/18*  (2006.01)
  *C08K 5/357* (2006.01)
  *C08K 5/5317* (2006.01)

(52) U.S. Cl.
  CPC .......... *C08J 9/18* (2013.01); *C08J 9/16* (2013.01); *C08K 5/357* (2013.01); *C08K 5/5317* (2013.01); *C08J 2323/16* (2013.01)

(58) Field of Classification Search
  CPC .......... C08J 9/16; C08J 9/18; C08J 2323/16; C08K 5/357; C08K 5/5317
  See application file for complete search history.

(56) References Cited

U.S. PATENT DOCUMENTS

| 2003/0105194 A1 | 6/2003 | Stuart et al. |
| 2004/0171708 A1 | 9/2004 | Yoshizawa et al. |
| 2011/0257310 A1 | 10/2011 | Butz |
| 2012/0037837 A1 | 2/2012 | Itoi |
| 2013/0158141 A1* | 6/2013 | Ravestyn ............ C08L 23/02 521/60 |
| 2014/0171534 A1 | 6/2014 | Fukuzawa |

FOREIGN PATENT DOCUMENTS

| EP | 1 038 912 A2 | 9/2000 |
| EP | 1 452 559 A1 | 9/2004 |
| EP | 1 454 947 A1 | 9/2004 |
| EP | 1 712 586 A1 | 10/2006 |
| JP | 08-059871 A | 3/1996 |
| JP | 2004-263033 A | 9/2004 |
| WO | 2003/048239 A | 6/2003 |
| WO | 2003/076505 A1 | 9/2003 |
| WO | 2004/035671 A1 | 4/2004 |
| WO | 2010/119670 A1 | 10/2010 |
| WO | 2012/028953 A1 | 3/2012 |
| WO | 2013/022049 A1 | 2/2013 |
| WO | 2013/136285 A1 | 9/2013 |
| WO | 2013/174482 A1 | 11/2013 |

OTHER PUBLICATIONS

International Search Report and Written Opinion dated Jan. 12, 2016, by the Japan Patent Office in corresponding International Application No. PCT/JP2015/078090, with English translation (18 pages).
PCT International Preliminary Report on Patentability and Written Opinion dated Apr. 4, 2017, by the International Bureau of WIPO in corresponding International Application No. PCT/JP2015/078090, with English translation (15 pages).
EPO Communication with Extended European Search Report dated Mar. 17, 2015, issued by the European Patent Office in corresponding European Application No. EP-14187638.3 (9 pages).

* cited by examiner

*Primary Examiner* — Irina S Zemel
(74) *Attorney, Agent, or Firm* — Osha Liang LLP

(57) ABSTRACT

A polyolefin-based resin pre-expanded particle includes a polyolefin-based resin; an organic phosphorus-containing compound being nitrogen-free; and a hindered amine having an OR group substituted directly on an N-atom where R is a saturated or unsaturated hydrocarbyl group, wherein the organic phosphorus-containing compound is at least one selected from the group consisting of alkyl phosphonic acid, an ester of the alkyl phosphonic acid, aryl phosphonic acid, an ester of the aryl phosphonic acid, a cyclic phosphonate, and a cyclic bisphosphonate, the polyolefin-based resin pre-expanded particle comprises from 1.0% by weight to 10% by weight of the organic phosphorus-containing compound and from 0.1% by weight to 5.0% by weight of the hindered amine, and the weight ratio of the organic phosphorus-containing compound to the hindered amine is from 1.0 to 20.

10 Claims, No Drawings

POLYOLEFIN-BASED RESIN PRE-EXPANDED PARTICLE, IN-MOLD FOAMED ARTICLE, PROCESS FOR PRODUCING THE POLYOLEFIN-BASED RESIN PRE-EXPANDED PARTICLE, AND PROCESS FOR PRODUCING THE IN-MOLD FOAMED ARTICLE

TECHNICAL FIELD

One or more embodiments of the present invention relate to flame retardant pre-expanded polymer materials, especially based on polyolefin particles. One or more embodiments of the present invention also relate to flame retardant foamed articles prepared by in-mold foaming or extrusion-foaming such flame retardant pre-expanded polymer materials. The in-molded foamed or extruded foamed articles thus formed are especially used in applications for vehicles, building, construction, furniture, electrical and electronic appliances. One or more embodiments of the present invention further relate to a process for producing said flame retardant pre-expanded polymer materials.

BACKGROUND

Nowadays, thermoplastic polymers are frequently made flame-retardant by adding phosphorus- or halogen-containing compounds. Mixtures of phosphorus- and nitrogen-containing compounds are also used as flame-retardant agents. However, the flame-retardant effect is too weak or the thermal stability of the resulting flame-retardant plastic is too low.

Salts of phosphinic acids have also been shown to be effective flame-retardant additives for polymers, producing minor changes in the thermal properties of the plastic, but still showing an insufficient flame-retardant effect. Halogen-containing organic compounds are assumed to act by chemically or physically interfering with combustion processes. It is assumed that e.g. organic halogen forms (such as decabromodiphenyl oxide, hexabromocyclodecane and tetrabromobisphenol A) produce hydrogen bromide which interacts with the free radical organic polymer.

In the recent years however, individual brominated flame retardants (e.g. polybrominated diphenyl ethers) were found potentially harmful to the environment and human health. Based on the results of the assessment of the dangers of brominated flame retardants, the provisions of the European Union since July 2006 prohibited the production and use of pentabromodiphenyl ether and octabromodiphenyl oxide, while limiting decabromodiphenyl oxide to certain uses. Various derivatives, for example ether, ester and carbonate derivatives, of pentaerythritol phosphate are known as flame retardant additives. A bromine-containing pentaerythritol phosphoester, pentaerythritol double-spiro phosphoryl double-tribromo neopentyl alcohol ester, is also known as a fire retardant.

Various hindered amines are commercially available and known to achieve thermal stabilization of various classes of thermoplastic polymers, especially when the latter are in the form of thin films. Flame retardant polyolefin pre-expanded particles made from a resin composition comprising a polyolefin and a triazine-containing hindered amine ether flame retardant are also known in the art, especially from Patent Literature 1. Patent Literature 2 discloses that the addition of carbon black to polyolefins does not impart a pre-expanded and foamed article therefrom with enhanced flame resistance but worsens the burning behavior. Patent Literature 2 also discloses that the incorporation of powdered activated carbon (hereinafter referred to as "PAC") and a triazine-containing hindered amine ether flame retardant in a foamed polyolefin further increases flame resistance.

Patent Literature 3 discloses that the incorporation of a phosphoric ester and a triazine-containing hindered amine ether flame retardant in an expanded polyolefin particle further increases flame resistance and does not generate harmful gases when burning.

Patent Literature 4 discloses that the incorporation of a triarylphosphine oxide and a triazine-containing hindered amine ether flame retardant in an expanded polyolefin particle with addition of at least 0.5% by weight carbon black, further increases flame resistance.

Patent Literature 5 discloses a thermoplastic polymer foamed article containing carbon black and a triazine-containing hindered amine ether.

Patent Literature 6 discloses a composition containing a hindered amine, phosphite, and the like.

Patent Literature 7 discloses a flame-retardant composition containing a sterically hindered alkoxyamine stabilizer, phosphazene, and the like.

Patent Literature 8 discloses a flame-retardant polymer composition containing a sterically hindered amine stabilizer, a phosphorous flame retardant, and the like.

Patent Literature 9 discloses a composition containing a hindered hydrocarbyloxy amine stabilizer.

Patent Literature 10 discloses a process for producing a flame-retardant polyolefin foam with use of a combination of a phosphorous compound and a 1,3,5-triazine compound as a flame retardant.

Patent Literature 11 discloses a mixture containing a phosphonate compound, a 1,3,5-triazine compound, and the like.

CITATION LIST

Patent Literatures

Patent Literature 1
  Specification of European Patent Application Publication No. 1454947
Patent Literature 2
  International Publication No. WO2012/028953
Patent Literature 3
  International Publication No. WO2010/119670
Patent Literature 4
  International Publication No. WO2013/022049
Patent Literature 5
  Specification of European Patent Application Publication No. 1452559
Patent Literature 6
  Specification of European Patent Application Publication No. 1712586
Patent Literature 7
  International Publication No. WO03/076505
Patent Literature 8
  International Publication No. WO2004/035671
Patent Literature 9
  Specification of European Patent Application Publication No. 1038912
Patent Literature 10
  International Publication No. WO2013/174482

Patent Literature 11
  Specification of United States Patent Application Publication No. 2011/0257310

SUMMARY

Foamed articles made from such pre-expanded particles can be suitably used in various fields requiring flame resistance or self-extinguishing property, such as transportation, building, construction, furniture, electrical and electronic appliances. However, with the more and more stringent level of flame retardancy required in these and other fields, such as electrical and electronic appliances, there is a growing need for further improving these polyolefin foamed materials. In particular, standards are getting harsher in all industrial fields and it may now be required, for safety purpose, that the burning test specimen does not drip particles which could ignite a dry absorbent placed in the neighborhood, e.g. below, the burning test specimen is not ignited by dripping particles (particles dripping from the burning test specimen). In contrast Patent Literature 5 discloses that the thermoplastic polymer foamed articles including a triazine-containing hindered amine ether as a flame retardant additive exhibit self-extinguishing property, but suffer from dripping particles when burning.

As a general rule, the skilled person knows that flame retardancy is much more difficult to achieve in a thermoplastic polymer foam than in a thermoplastic polymer film, tube or other form of non-expanded material. In particular, a recipe that has been found suitable for a non-expanded thermoplastic polymer will not necessarily be suitable for the corresponding expanded form of this polymer. Also, it is rather common that special polymer grades are preferred for making thermoplastic polymer foams, due to the additional characteristics that are required, such as surface appearance, cushioning properties, closed cell proportion in the foam, and mechanical properties such as, but not limited to, impact strength, dimensional shrinkage and compressive strength. All these properties of the foam material are likely to be affected by the presence of further additives, in such a way that the optimal bundle of properties can no longer meet the requirements of the final expanded product in the relevant field of industry.

One or more embodiments of the present invention relate to a composition of expanded or foamed polyolefin material which meets this non dripping and/or non ignition requirement, without impairing, or being detrimental to, the other requirements of the resulting foam, such as its mechanical properties, cushioning properties and surface appearance. At the same time, the foam should exhibit good moldability or extrudability, and should not generate harmful gases when burning. One or more embodiments of the present invention overcome malodor generation during processing due to certain flame retardant additives. This malodor generation results into additional production costs e.g. due to the need for additional ventilation of the production facility. One or more embodiments of the present invention overcome the risk of migration of certain flame retardant additives towards the surface of the polyolefin pre-expanded particles and/or the foamed article produced there from. This migration is important since it may be associated with a poor compatibility or a non-homogeneous dispersion of the additive throughout the thermoplastic polymer matrix and since it may therefore result in internal defects or surface defects of the foamed thermoplastic article.

One or more embodiments of the present invention provide flame retardant thermoplastic polymer foamed articles which can be produced with good moldability or extrudability, which do not generate harmful gases when burning, and which exhibit better flame retardancy than thermoplastic polymer foamed articles known in the art. In particular, one or more embodiments of the present invention provide flame retardant thermoplastic polymer foamed articles which do not drip particles when burning, and therefore do not ignite proximal organic materials. One or more embodiments of the present invention provide flame retardant thermoplastic polymer foamed articles having both excellent flame resistance, in particular preventing the occurrence of dripping particles and the generation of harmful gases when burning, and mechanical properties, cushioning properties and surface appearance, compared to known thermoplastic polymer foamed articles including a triazine-containing hindered amine ether as a flame retardant additive. One or more embodiments of the present invention provide flame retardant thermoplastic polymer foamed articles having both excellent flame resistance, in particular preventing the occurrence of dripping particles and the generation of harmful gases when burning, and mechanical properties, cushioning properties and surface appearance, compared to known thermoplastic polymer foamed articles including the combination of a phosphoric ester and a triazine-containing hindered amine ether or the combination of a phosphine oxide and a triazine-containing hindered amine ether, as a flame retardant additive.

One or more embodiments of the present invention provide flame retardant thermoplastic polymer pre-expanded particles which can be molded into foamed articles having both excellent flame resistance and physical properties, without inducing processing problems either during pre-expansion or during the subsequent molding step, and even if significant amounts of other additives such as powdered activated carbon and/or carbon black are also present.

It has surprisingly been found that the incorporation, in selected proportions, of both an organic phosphorous-containing compound, except for a phosphoric ester, a phosphate or a triarylphosphine oxide, and a hindered amine substituted with an OR group directly on its nitrogen atom, into an expanded (foamed) thermoplastic polymer material increases flame retardancy, in particular precludes the occurrence of dripping particles during burning and thus prevents ignition of proximal organic materials. This property is achieved without impairing the other mechanical and cushioning characteristics of the foamed thermoplastic polymer material and without impairing the capacity to incorporate other optional additives.

Therefore one or more embodiments of the present invention relate to a flame retardant pre-expanded polymer material as described below: A polyolefin-based resin pre-expanded particle including: (B) an organic phosphorus-containing compound being nitrogen-free and at least one kind selected from the group consisting of: alkyl phosphonic acids and aryl phosphonic acids, and esters thereof; cyclic phosphonates; and cyclic bisphosphonates; and (C) a hindered amine having an OR group substituted directly on its N-atom where R is a saturated or unsaturated hydrocarbyl group, wherein, of 100% by weight of the polyolefin-based resin pre-expanded particle, the organic phosphorus-containing compound (B) accounts for not less than 1.0% by weight and not more than 10% by weight, and the hindered amine (C) accounts for not less than 0.1% by weight and not more than 5.0% by weight, and the weight ratio of the organic phosphorus-containing compound (B) to the hindered amine (C) ((B)/(C)) is not less than 1.0 and not more than 20.

The flame retardant pre-expanded polymer material of the instant case may be produced, inter alia, by a process as described below: A process for producing a polyolefin-based resin pre-expanded particle, including the steps of: providing a mixture of (A) a polyolefin-based resin, (B) an organic phosphorus-containing compound being nitrogen-free and at least one kind selected from the group consisting of: alkyl phosphonic acids and aryl phosphonic acids, and esters thereof; cyclic phosphonates; and cyclic bisphosphonates, and (C) a hindered amine having an OR group substituted directly on its N-atom where R is a saturated or unsaturated hydrocarbyl group; impregnating the mixture with a volatile blowing agent in an aqueous dispersion under high temperature and high pressure conditions; and decompressing, to atmospheric pressure, the mixture impregnated with the volatile blowing agent, wherein, of 100% by weight of the polyolefin-based resin pre-expanded particle, the organic phosphorus-containing compound (B) accounts for not less than 1.0% by weight and not more than 10% by weight, and the hindered amine (C) accounts for not less than 0.1% by weight and not more than 5.0% by weight, and the weight ratio of the organic phosphorus-containing compound (B) to the hindered amine (C) ((B)/(C)) is not less than 1.0 and not more than 20.

The instant case also relates to an in-mold foamed article prepared by in-mold foaming of the polyolefin-based resin pre-expanded particle according to one or more embodiments of the invention. One or more embodiments of the invention shall be better understood upon reading the following description.

According to one or more embodiments of the present invention, it is possible to provide a foamed thermoplastic polymer material which does not impair mechanical properties, cushioning properties, and the capacity to incorporate other optional additives, and which improves flame retardancy.

DESCRIPTION OF EMBODIMENTS

Each compound of the flame retardant pre-expanded polymer material according to one or more embodiments of the present invention will now be presented in more details. In this specification, "foamed material" means a material obtained through a foaming step. Particularly, in a case where the foamed material means a material obtained through a foaming step before in-mold foaming etc., the foamed material is called "pre-expanded material". A particulate pre-expanded material is called "pre-expanded particle". A foamed material obtained by foaming a thermoplastic polymer material is sometimes called "foamed thermoplastic polymer material" or "pre-expanded thermoplastic polymer material". The "pre-expanded thermoplastic polymer material" is sometimes simply called "pre-expanded polymer material". "Foam" and "foamed article" mean a product obtained from a foamed material. Particularly, a foam obtained through in-mold foaming is called "in-mold foamed article".

One or more embodiments of the present invention exert an excellent flame retardancy without a halogen flame retardant, because it has features described below.

<1. Organic Phosphorus-Containing Compound (B)>

In order to achieve the goals of one or more embodiments of the present invention, there is no stringent limitation on the choice of the organic phosphorus-containing compound (B) as long as it is not a phosphoric ester, a phosphate or a triarylphosphine oxide, and as long as it is combined with the hindered amine (C) in the selected ratio by weight. As is well known to the skilled person in the art, there are numerous sub-classes of organic phosphorus-containing compounds apart from phosphoric esters, phosphates and triarylphosphine oxides. Although, as the skilled person is well aware, there may be a diversity of flame retardant properties among these sub-classes of organic phosphorus-containing compounds, it can be concluded from the tests performed by the present inventors, that the organic phosphorus-containing compounds (B) provide a significant enhancement of flame retardancy in pre-expanded polymer materials, especially in pre-expanded polypropylene-based materials, when combined with the hindered amine (C) in a selected weight ratio (B)/(C) ranging from about 1.0 to 20. Also, the invention is not limited to the incorporation of a single organic phosphorus-containing compound (B) but encompasses the incorporation of two or more organic phosphorus-containing compounds (B) which may, or may not, belong to different sub-classes thereof. The selection of two or more organic phosphorus-containing compounds (B) is only limited by their compatibility, which is usually good due to their common organic nature, and can be easily determined by the skilled person without undue burden.

For the purpose of illustrating various embodiments of the present invention, suitable sub-classes of organic phosphorus-containing compounds (B) according to one or more embodiments of the present invention, other than phosphoric ester, phosphates and triarylphosphine oxides, are listed below.

In one or more embodiments, the organic phosphorus-containing compound (B) is nitrogen-free, i.e. does not contain any N-atom in its structural formula. In another embodiment, the organic phosphorus-containing compound (B) is both nitrogen-free and chlorine-free, i.e. does not contain any Cl-atom in its structural formula. Many such compounds are commercially available.

A first sub-class within this group of organic nitrogen-free phosphorus-containing compounds (B) consists of phosphonates.

Esters and partial esters containing R—PO(OH)$_2$ and/or R—PO(OR$_1$)$_2$ groups (wherein R is a hydrocarbyl group such as methyl, benzyl, aryl, alkynyl, allenyl, vinyl or substituted vinyl; and wherein R$_1$ is a hydrocarbyl group such as alkyl or aryl), and salts thereof, are suitable for carrying out one or more embodiments of the present invention. Phosphonic acid esters and phosphonate salts are advantageously soluble in water and common alcohols. Examples include alkyl phosphonates such as, but not limited to, dimethyl methylphosphonate, a very effective flame retardant due to its high phosphorus content.

In turn, phosphonates can be sub-divided into sub-groups such as alkyl phosphonic acids and aryl phosphonic acids and esters thereof, mono-phosphonates, acyclic bisphosphonates, cyclic phosphonates, and cyclic bisphosphonates.

Cyclic phosphonates represented by the structural formula

[Chem. 1]

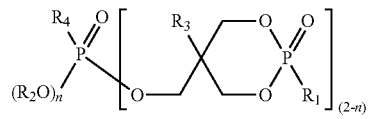

wherein R$_1$ and R$_2$ are independently C$_{1-4}$ alkyl, R$_3$ is H or C$_{1-4}$ alkyl, R$_4$ is C$_{9-22}$ alkyl, C$_{9-22}$ cycloalkyl, C$_{9-22}$ aryl or C$_{9-22}$ aralkyl, and n=0 or 1, as disclosed by EP 1651737-B, are also suitable.

Cyclic bisphosphonates (also referred in the literature as spirophosphonates), such as pentaerythrityl diphosphonates disclosed by U.S. Pat. No. 4,174,343 and GB 1,515,223, being represented by the structural formula

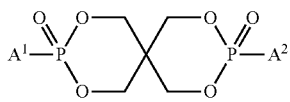
[Chem. 2]

wherein $A^1$ and $A^2$ are independently $C_{1-10}$ alkyl, $C_{2-10}$ alkenyl, benzyl, phenylethyl, phenyl or naphthyl, may be used.

A suitable nitrogen-free organic phosphorus-containing compound (B) is commercially available in the form of a white powder under, for example, the trade name AFLAMMIT PCO 900 (P content 24%) represented by the structural formula. The organic phosphorus-containing compounds (B) may be micronized or not.

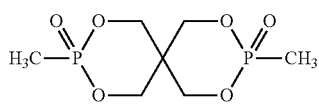
[Chem. 3]

Other cyclic phosphonic esters have been disclosed in FR 1,503,429.

Another sub-class of organic nitrogen-free phosphorus-containing compounds (B) consists of organic phosphites. Examples include alkyl phosphites and arylalkyl phosphites (for example, wherein the alkyl group has from 1 to 4 carbon atoms) such as dimethyl phosphite, diethyl phosphite, trimethyl phosphite, dibutylphosphite, triisopropyl phosphite, dibenzyl phosphite, bis(2,2,2-trifluoroethyl) phosphite, tris (2,2,2-trifluoroethyl) phosphite, tris(1,1,1,3,3,3-hexafluoro-2-propyl) phosphite, and diphenyl phosphite. Further examples include cyclic phosphites such as, but not limited to, trimethylolethane cyclic phosphite (also known as 4-methyl-2,6,7-trioxa-1-phosphabicyclo[2.2.2]octane) and cyclic hydrogen phosphites as broadly described in U.S. Pat. No. 3,152,164, such as for instance 2-hydroxy-4,5-dimethyl-1,3,2-dioxaphospholane (2,3-butylene hydrogen phosphite), 2-hydroxy-4-methyl-1,3,2-dioxaphosphorinane, 2-hydroxy-4-methyl-1,3,2-dioxa-phospholane (propylene hydrogen phosphite), 2-hydroxy-1,3,2-dioxaphos-phorinane (trimethylene hydrogen phosphite), 2-hydroxy-5,5-dimethyl-1,3,2-dioxaphosphorinane, and 2-hydroxy-4-propyl-5-ethyl-1,3,2-dioxaphosphorinane.

Note that the organic phosphorus-containing compounds (B) may be organic phosphorus-containing compounds other than organic phosphites.

Another sub-class of organic nitrogen-free phosphorus-containing compounds (B) consists of organic phosphinites such as ethyl phosphinite, and phosphinic or diphosphinic acid metal salts represented by the formulae $RR'P(=O)$—OMe and $MeO$—$PR(=O)$—$R_1$—$PR'(=O)$—$OMe$, wherein R and R' are independently selected from the group consisting of $C_{1-6}$ alkyl, $C_{3-8}$ cycloalkyl, $C_{6-16}$ aryl or aralkyl, Me is a metal from Group I (alkali), II (alkaline-earth, or zinc) or III (e.g. aluminium) of the Periodic System, and $R_1$ is $C_{1-6}$ alkylene, arylene, arylalkylene or arene-bisalkylene linking group. Non-limiting examples thereof are the alkali, magnesium, zinc and aluminum salts of dimethyl phosphinic, methylethylphosphinic, methylpropylphosphinic, methylhexylphosphinic, ethylphenylphosphinic, diethylphosphinic, ethane-1,2-dimethylphosphinic, ethane-1,2-diethylphosphinic, ethane-1,2-diphenylphosphinic and butane-1,4-dimethylphosphinic acid.

Another sub-class of organic nitrogen-free phosphorus-containing compounds (B) consists of phosphinates such as aluminium diethyl phosphinate.

In one or more embodiments of the present invention, the organic nitrogen-free phosphorous-containing compound (B) may be a polyol phosphate alcohol. Many such compounds are commercially available, such as bis(pentaerythritol phosphate alcohol) alkyl phosphonate wherein the alkyl group has from 1 to 4 carbon atoms, or a (pentaerythritol phosphate alcohol) phosphite. Due to their low bromine content, brominated derivatives thereof, such as a dibromo neopentyl glycol phosphate or a pentaerythritol double-spiro phosphoryl double-tribromo neopentyl alcohol ester, can also be used as an organic phosphorus-containing compound (B).

In one or more embodiments of the present invention, the organic phosphorus-containing compound (B) is nitrogen-containing, i.e. does contain one or more N-atoms in its structural formula. Examples from this group include phosphoramidates, phosphoramidites, phosphonamides, phosphinamides, and organic phospha-zenes and salts thereof.

Suitable examples of phosphoramidates include those represented by the following structural formulae

[Chem. 4]

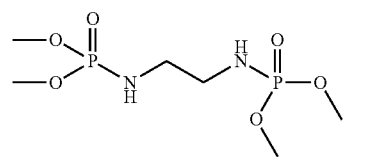

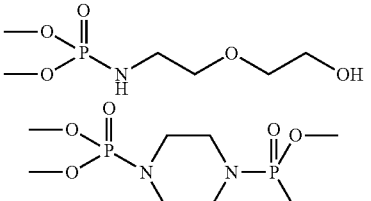

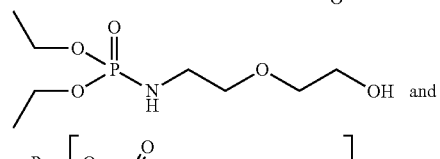

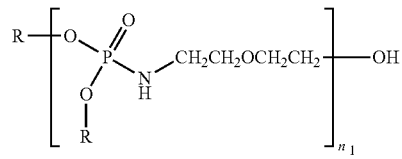

$R = CH_3, CH_2CH_3$
$n_1 = 2\text{-}10$ all of them being disclosed by WO 2009/153034.

Suitable organic phosphazenes (also known as iminophosphoranes or phosphine imides) and salts (for example, chlorides and fluorides) thereof include a phosphorus atom covalently linked to a N-atom by a double bond and to three other atoms or radicals by single bonds. Representative but non limiting examples thereof include bis(triphenylphosphine)iminum chloride, BEMP (2-tert-butylimino-2-diethylamino-1,3-dimethylperhydro-1,3,2-diazaphosphorine), BTPP (tert-butylimino)tris-(pyrrolidino)phosphorane), and t-Bu-P4 (3-t-butylimino-1,1,1,5,5,5-hexakis(dimethylamino)-3{[tris(dimethylamino)phosphoranylidene]amino}-$1\lambda^5,3\lambda^5,5\lambda^5$-1, 4-triphosphazadiene). Suitable cyclic organic phosphazenes include those represented by the following structural formula

[Chem. 5]

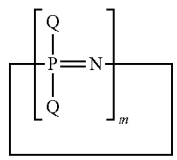

wherein m=3-20, and each Q group is either a phosphate group or a aryloxy or alkoxy group containing no phosphorous or halogen atoms, as disclosed by WO 2009/055993. A species thereof is the compound DPPPZ shown in the following structural formula (wherein Ph=phenyl)

[Chem. 6]

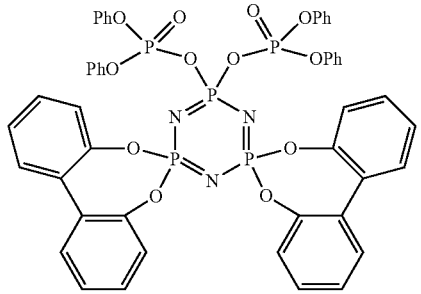

<2. Hindered Amine (C)>

In order to achieve the goals of one or more embodiments of the present invention, there is no stringent limitation on the choice of the hindered amine (C) as long as it is combined with the organic phosphorus-containing compound(s) (B) in the selected ratio by weight. As is well known to the skilled person, there are numerous sub-classes of hindered amines (C). Although, as the skilled person is well aware, there may be a diversity of flame retardant properties among these sub-classes of the hindered amines, it can be concluded from the tests performed by the applicant, that they provide a significant enhancement of flame retardancy when combined with the organic phosphorus-containing compound(s) (B) in a selected weight ratio (B)/(C) ranging from about 1.0 to 20. Also, the invention is not limited to the incorporation of a single hindered amine (C) but encompasses the incorporation of two or more hindered amines (C) which may, or may not, belong to different sub-classes thereof. The selection of two or more hindered amines (C) is only limited by their compatibility, which is usually good due to their common organic nature, and can be easily determined by the skilled person in the art without undue burden.

For the purpose of illustrating various embodiments of the present invention, suitable sub-classes of hindered amines (C) are listed below. The hindered amines (C) according to one or more embodiments of the present invention have an OR group substituted directly on its N-atom, wherein R is a saturated or unsaturated hydrocarbyl group.

In one or more embodiments of the present invention, the hindered amine (C) includes at least a triazine moiety. Thus, examples of suitable N-substituted hindered amines which have at least a triazine moiety (also referred in the literature as triazine-containing hindered amine), include, but are not limited to, N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamines, their pure isomers, and bridged derivatives thereof as broadly described by EP 0889085-B. More specific examples thereof are disclosed from page 2 line 32 to page 4 line 6 of EP 0889085-B. Suitable triazine-containing hindered amines (C) are commercially available from BASF, under the trade name FLAMSTAB NOR 116, and from CLARIANT under the trade name HOSTAVIN NOW XP.

Further suitable N-substituted hindered amines are represented by the following structural formula

[Chem. 7]

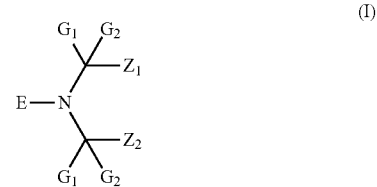

(I)

wherein $G_1$ and $G_2$ are independently $C_{1-8}$ alkyl or are together pentamethylene; $Z_1$ and $Z_2$ are each methyl, or $Z_1$ and $Z_2$ together form a linking moiety which may additionally be substituted by an ester, ether, amide, amino, carboxy or urethane group; and E is $C_{1-8}$ alkoxy, $C_{5-12}$ cycloalkoxy or $C_{7-15}$ aralkoxy, or E is a group —O—C(O)—$C_{1-18}$ alkyl or —O-T-(OH)$_b$; T is a $C_{1-18}$ alkylene, $C_{5-18}$ cycloalkylene or $C_{5-18}$ cycloalkenylene chain, or a $C_{1-4}$ alkylene chain substituted by phenyl or by $C_{1-4}$ alkyl-substituted phenyl; b is 1-3 with the proviso that b cannot exceed the number of carbon atoms in T, and when b is 2 or 3, each hydroxyl group is attached to a different carbon atom of T. Such compounds are broadly described by EP 2225318-B. More specific examples thereof are disclosed from page 5 line 35 to page 25 line 48 of EP 2225318-B.

Suitable N-substituted hindered amines (C) are represented by the following structural formula

[Chem. 8]

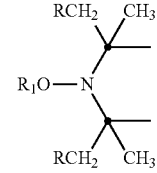

wherein R is hydrogen or methyl, and $R_1$ is selected from the group consisting of $C_{1-18}$ alkyl, $C_{2-18}$ alkenyl, $C_{2-18}$ alkynyl, $C_{5-12}$ cycloalkyl, $C_{5-8}$ cycloalkenyl, $C_{6-10}$ aryl and $C_{7-9}$ aralkyl, as broadly described by EP 0309402-B. More specific examples thereof are disclosed from page 3 line 33 to page 8 line 58 of EP 0309402-B.

Further suitable N-substituted hindered amines are represented by the following structural formulae (Ia) and (Ib)

[Chem. 9]

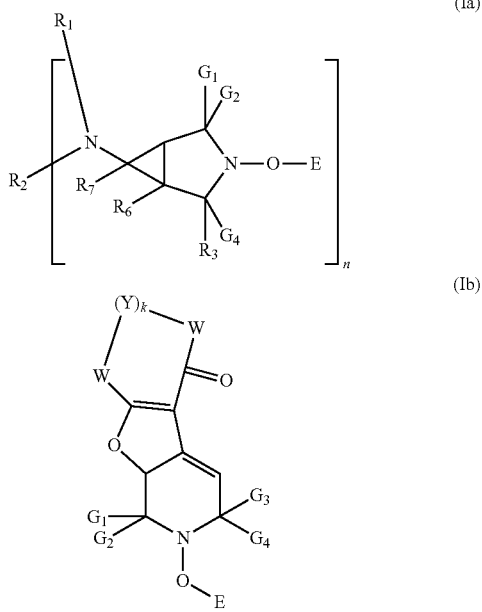

wherein E, Y, W, $R_1$-$R_7$ and $G_1$-$G_4$ are as broadly defined in U.S. Pat. No. 8,598,369. More specific examples thereof are disclosed in examples 1-12 and tables 1-5 of U.S. Pat. No. 8,598,369.

More than one flame-retardant hindered amine (C) may be combined with the organic phosphorus-containing compound (B). In one or more embodiments of the present invention, the particle size of the hindered amine (C) may be approximate to the particle size of the organic phosphorus-containing compound (B), so that homogeneity of the resulting mixture can be easily ensured in the presence of the thermoplastic polymer material (A).

The incorporation of a cyclic bisphosphonate as organic phosphorous-containing compound (B) and a triazine-containing hindered amine as hindered amine (C) may be used, because it can provide flame retardant thermoplastic polymer foamed articles having both excellent flame resistance, in particular preventing the occurrence of dripping particles and the generation of harmful gases when burning, and mechanical properties, cushioning properties and surface appearance, even though a small amount of flame retardant is used. The incorporation of pentaerythrityl diphosphonates being represented by the structural formula

[Chem. 10]

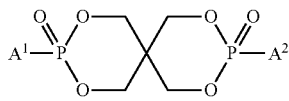

wherein $A^1$ and $A^2$ are independently $C_{1-10}$ alkyl, $C_{2-10}$ alkenyl, benzyl, phenylethyl, phenyl or naphthyl, and N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamines, their pure isomers, and bridged derivatives thereof, may be used.

<3. Weight Ratio (B)/(C)>

In this specification, a weight ratio (B)/(C) means a weight ratio of an organic phosphorous-containing compound (B) to a hindered amine (C). In order to achieve the goals of one or more embodiments of the present invention, the weight ratio (B)/(C) should be not less than 1.0 and not more than 20, such as not less than 1.9 and not more than 10. The skilled person understands that the optimal weight ratio (B)/(C) may depend upon the class of hindered amine (C), the class of the organic phosphorus-containing compound (B) and the selected thermoplastic polymer material (A). However, given the guidance provided herein, the skilled person will be able, without undue burden, to determine the optimal range in each situation. The inventors found that a weight ratio (B)/(C) below 1.0 or above 20 does not provide an enhancement of the flame retardant properties as desired, and especially does not preclude the occurrence of dripping particles during burning. It has also been found that a weight ratio (B)/(C) below 1.0 or above 20 may either induce significant difficulties during processing or may impair the other physical (for example, mechanical and cushioning) characteristics of the foamed thermoplastic polymer material resulting therefrom. In one or more embodiments of the present invention, the range of weight ratio (B)/(C) may be from 2 to 9, such as 2.0 to 4.5.

In the combination of the cyclic bisphosphonates and the triazine-containing hindered amine, a suitable range of the weight ratio (B)/(C) may be from 2.0 to 8.0, such as 2.0 to 3.5.

<4. Thermoplastic Polymer Material (A)>

In order to achieve the goals of one or more embodiments of the present invention, there is no stringent limitation on the choice of the thermoplastic polymer material (A) as long as it is combined with the organic phosphorus-containing compound (B) and the hindered amine (C) in the selected ratio by weight (B)/(C), and as long as it is able to form pre-expanded particles capable of fusing into a foam under suitable molding or extrusion conditions.

Suitable thermoplastic polymer materials (A) are given below.

polymers and copolymers of mono-olefins and diolefins, for example polypropylene, polyisobutylene, po-lybut-1-ene, poly-4-methylpent-1-ene, polyvinylcyclohexane, polyisoprene or polybutadiene, as well as polymers of cycloolefins, e.g. cyclopentene or norbornene, polyethylene, e.g. high density polyethylene (HDPE), medium density polyethylene (MDPE), low density polyethylene (LDPE), and linear low density polyethylene (LLDPE). Note that a merely called "low density polyethylene" in this specification means a branched low-density polyethylene. Polyolefin-based resins are superior in chemical resistance, heat resistance and distortion restoration rate after compression as compared to polystyrene, and therefore may be used in one or more embodiments of the present invention as the thermoplastic polymer material (A) that is the base material of the pre-expanded particles. Polyolefin-based resins used in one or more embodiments of the present invention may be homopolymers of an olefin monomer, and copolymers of 75 to 100% by weight of an olefin monomer (a) and 25 to 0% by weight of an olefin monomer (b) different from the olefin monomer (a). The content of the olefin monomer (a) that is a main component may be not less than 75% by weight, because, in this case, the characteristics brought from the olefin monomer (a) are sufficiently retained. Examples of the olefin monomer (a) are e.g. α-olefins having 2 to 12 carbon atoms, e.g. ethylene, propylene, butene-1, isobutene, hexene-1, 4-methylpentene-1, octene-1 and decene-1. Examples of the olefin monomer (b) are e.g. cyclic olefins such as cyclopentene and norbornene, dienes such as 1,4-hexadiene. The polyolefin-based resins may be at least one kind selected from the group consisting of polypropylene-based resin, low density polyethylene, linear low-density polyethylene, and high density polyethylene. In a case where the polyolefin-based resins are the at least one kind selected from the group consisting of polypropylene-based resin, low density polyethylene, linear low-density polyethylene, and high density polyethylene, excellent appearance and cushioning properties are easily attained. The polypropylene-based resin may be at least one kind selected from the group consisting of homopolypropylene, propylene-ethylene copolymer, and propylene-ethylene-1-butene copolymer. In a case where the polypropylene-based resin is the at least one kind selected from the group consisting of homopolypropylene, propylene-ethylene copolymer, and propylene-ethylene-1-butene copolymer, excellent mechanical properties, in addition to the excellent appearance and cushioning properties, are easily attained. Propylene-ethylene copolymers containing 0.5% to 15% by weight (for example, 1% to 4%) ethylene and 85% to 99.5% by weight (for example, 96% to 99%) propylene may be used from the viewpoint that pre-expanded particles having a uniform closed cell structure are easily obtained. Non-crosslinked polyolefin-based resins may be used from the viewpoints of cost, recyclability and simplicity of process steps. The polyolefin-based resins may have a melt index (hereinafter referred to as MI, determined according to ASTM 1238 or ISO 1133. Note that, in a case of a polyethylene-based resin, the melt index is measured under a load of 2160 g and at a temperature of 190° C., and in a case of the polypropylene-based resin, the melt index is measured under a load of 2160 g and at a temperature of 230° C.) from about 0.1 to 50 g/10 minutes, especially from 0.3 to 40 g/10 minutes. If the MI of the polyolefin-based resins is not less than 0.1 g/10 minutes, the fluidity of the resin at the time of foaming is favorable and foaming is easy. If the MI is not more than 50 g/10 minutes, it is possible to achieve a high expansion ratio since the fluidity is moderate.

ethylene/alkyl acrylate copolymers, ethylene/alkyl methacrylate copolymers, ethylene/vinyl acetate copolymers or ethylene/acrylic acid copolymers and their salts (ionomers).

aromatic homo- and copolymers derived from vinyl aromatic monomers including styrene, α-methylstyrene, vinyl toluene, ethyl styrene, propyl styrene, and vinyl naphthalene. These homo- and copolymers may have any stereostructure including syndiotactic, isotactic, hemi-isotactic or atactic, although atactic polymers may be used.

copolymers including the aforementioned vinyl aromatic monomers and one or more comonomers selected from the group consisting of ethylene, propylene, dienes, nitriles, maleic acid, maleic anhydride, maleimide, vinyl acetate, vinyl chloride and acrylic derivatives, e.g. styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; styrene block copolymers such as styrene/butadiene/styrene, styrene/isoprene/styrene, styrene/ethylene/butylene/styrene or styrene/ethylene/propylene/styrene; graft copolymers of vinyl aromatic monomers such as copolymer mixtures known as ABS, MBS, ASA or AES polymers.

Halogen-containing thermoplastic polymers such as polyvinyl chloride, polyvinylidene chloride, polyvinyl fluoride, polyvinylidene fluoride.

<5. Weight Ratio (A)/{(B)+(C)}>

In this specification, a weight ratio (A)/{(B)+(C)} means a weight ratio of a thermoplastic polymer material (A) contained in a pre-expanded polymer material to a total weight of a hindered amine (C) and an organic phosphorus-containing compound (B). In order to achieve the goals of one or more embodiments of the present invention, there is no stringent limitation on the proportion of the thermoplastic polymer material (A) with respect to the organic phosphorus-containing compound(s) (B) and the hindered amine(s) (C), as long as a homogeneous blend or mixture of these three essential components can be obtained without processing difficulty. In one or more embodiments of the present invention the flame retardant pre-expanded polymer material may be one wherein the weight ratio (A)/{(B)+(C)} is from 3 to 100, from 5.6 to 90, from 10 to 48, from 15 to 40, or from 22 to 35. The weight ratio (A)/{(B)+(C)} may be from 3 to 89, or from 5.7 to 89.

In case the weight ratio (A)/{(B)+(C)} is not more than 100, the pre-expanded polymer material tends to sufficiently exert the non-dripping and/or non-ignition property.

In case the weight ratio (A)/{(B)+(C)} is not less than 3, the pre-expanded polymer material tends to not only suppress raw materials cost, but also prevent a heavily wrinkled aspect. Therefore, the in-mold foamed article made thereof shows a low shrinkage level, and a high mechanical strength.

In the combination of (i) an organic nitrogen-free phosphorus-containing compound (B) that is at least one kind selected from the group consisting of: alkyl phosphonic acids and aryl phosphonic acids, and esters thereof; cyclic phosphonates; and the cyclic bisphosphonates and (ii) a hindered amine (C) having an OR group substituted directly on its N-atom, wherein R is a saturated or unsaturated hydrocarbyl group, a suitable range of the weight ratio (A)/{(B)+(C)} may be from 15 to 45, such as from 22 to 35. The amount of these additives by weight in 100% by weight of the pre-expanded polymer material according to one or more embodiments of the invention (including further optional non-flame retardant additives, see below) may be limited to:

about 1.0% to 10%, 1.5% to 8.0%, 1.8% to 6.0%, 1.8% to 4.0%, or 2.0% to 4.0% by weight of the organic phosphorus-containing compound(s) (B), and about 0.1% to 5.0%, 0.2% to 3.0%, such as 0.3% to 2.0% by weight of the hindered amine(s) (C).

In case that the amount of the organic phosphorous-containing compound(s) is less than 1.0% by weight or the amount weight of the hindered amine(s) (C) is less than 0.1% by weight, the pre-expanded polymer material tends to lose the non-dripping and/or non-ignition property.

In case that the amount of the organic phosphorous-containing compound(s) is more than 10% by weight or the amount of the hindered amine(s) (C) is more than 5.0% by weight, the pre-expanded polymer material tends to not only suffer from a high raw materials cost, but also obtain a heavily wrinkled aspect. Therefore, the in-mold foamed article made thereof shows a shrinkage level which is significantly more than average, and the significantly weakened mechanical strength.

Since the pre-expanded polymer material includes the organic phosphorus-containing compound (B) and the hindered amine (C) as described above, the pre-expanded polymer material can exert an excellent flame retardancy even if the content of a flame retardant is small.

In terms of exerting a most stable flame retardancy (an effect of precluding the occurrence of dripping particles), the organic phosphorus-containing compound (B) may be not less than 2.0% by weight and not more than 4.0% by weight, and the hindered amine (C) may be not less than 0.3% by weight and not more than 2.0% by weight.

In some cases, depending upon the selection of the thermoplastic polymer material (A), the organic phosphorus-containing compound (B) and the hindered amine (C), it may be useful to first prepare a so-called master-batch of the blend. Under such instances, the weight ratio (A)/{(B)+(C)} in the master-batch may be from about 3 to 15, and the master-batch is then further diluted with additional amounts of the thermoplastic polymer material (A) to achieve the desirable final polymer proportion.

<6. Other Additives>

If it is useful for certain end uses of the resulting thermoplastic polymer foam, the flame retardant pre-expanded polymer material according to one or more embodiments of the present invention may further comprise, in usual proportions for these types of (non-flame retardant) additives, one or more known functional additives or fillers such as, but not limited to:

Antioxidants such as alkylated monophenols, alkyltyhiomethylphenols, hydroquinones and alkylated hydroquinones, tocopherols, hydroxylated thiodiphenyl ethers, alkylidene bisphenols, O—, N— and S— containing benzyl compounds, hydroxybenzylated malonates, aromatic hydroxybenzyl compounds, acylaminophenols, amides and esters of hydroxyphenylpropionic acid, and aminated antioxidants;

UV light absorbers such as benzotriazoles, benzophenones, benzoic acid esters, nickel complexes, hindered amines which (contrary to the ingredient (C) according to one or more embodiments of the present invention) do not possess an OR group directly linked to their N-atom, and oxamides;

Peroxide scavengers such as mercaptobenzimidazole;

Inorganic nucleating agents such as, but not limited to, talcum, titanium oxide, magnesium oxide, magnesium carbonate and magnesium sulfate; organic nucleating agents such as, but not limited to, mono- or polycarboxylic acids (e.g. adipic or diphenylacetic) and salts thereof, ionic copolymers and the like;

Fillers and reinforcing agents such as, but not limited to, silicates, glass fibers, kaolin, wood flour, and the like;

Lubricants such as fatty acid esters, polyethylene waxes (which may be optionally partly saponified), zinc stearate, glycerol esters, and alkaline earth metal soaps.

The flame retardant pre-expanded polymer material according to one or more embodiments of the present invention may exhibit a bulk density from 10 kg/m$^3$ to 300 kg/m$^3$. In one or more embodiments the bulk density ranges from about 15 kg/m$^3$ to 200 kg/m$^3$, or from about 20 kg/m$^3$ to 60 kg/m$^3$. The flame retardant pre-expanded polymer material according to one or more embodiments of the present invention exhibit an average cell diameter ranging from 50 to 1,000 μm, such as from 100 to 500 μm. The proportion of closed cells in the flame retardant pre-expanded polymer material according to one or more embodiments of the present invention may range from about 90% to 99%. If the closed cells proportion is not lower than 90%, the foamed product prepared from the expanded particles tends to be unlikely to shrink, and improve the melt adhesion property.

In one or more embodiments of the present invention, the flame retardant pre-expanded polymer material may further comprise carbon black to impart a grey or black color to the resulting foam, depending upon the amount used. In contrast with the teaching of EP 2611860, it has been found that from 0.01% to below 6% by weight carbon black does not significantly alter or impair the flame retardant properties of the pre-expanded thermoplastic material, and of the foamed product made there from.

In terms of maintenance of flame retardancy and uniform coloring, the content of carbon black may be not less than 0.01% by weight and not more than 2% by weight, not less than 0.01% by weight and not more than 0.5% by weight, or not less than 0.1% by weight and not more than 0.5% by weight.

In one or more embodiments of the present invention, the flame retardant pre-expanded polymer material may further comprise powdered activated carbon to participate into the enhancement of the flame retardancy of the resulting foam, depending upon the amount used. In line with the teaching of EP 2611860, it has been found that from 0.5% to 3% by weight powdered activated carbon (PAC) together with the organic phosphorus-containing compound (B) and the hindered amine (C) makes it possible to retain or even further increase the flame retardant properties of the pre-expanded thermoplastic material, and of the foamed product made there from.

In terms of further improvement of flame retardancy, the content of powdered activated carbon may be not less than 0.8% by weight and not more than 2.8% by weight, such as not less than 1% by weight and not more than 2.5% by weight.

<7. Process for Producing Pre-Expanded Polymer Material>

Broadly speaking, the flame retardant pre-expanded polymer material according to one or more embodiments of the present invention may be produced by a process comprising the steps of:

providing a mixture of a thermoplastic polymer material (A) with an organic phosphorus-containing compound (B) wherein the phosphorus-containing compound (B) is not a phosphoric ester, a phosphate or a triarylphosphine oxide, and a hindered amine (C) having an OR group substituted directly on the N-atom of the hindered amine, wherein R is a saturated or unsaturated hydrocarbyl group, the weight ratio (B)/(C) being from 1.0 to 20, and the weight ratio (A)/{(B)+(C)} optionally being from 3 to 89 (for example, from 10 to 48), impregnating said mixture with a volatile blowing agent in an aqueous dispersion under high temperature and high pressure conditions, and decompressing the impregnated mixture to atmospheric pressure.

Note that, as described above, of 100% by weight of the pre-expanded polymer material, the organic phosphorus-containing compound (B) may account for not less than 1.0% by weight and not more than 10% by weight, and the hindered amine (C) may account for not less than 0.1% by weight and not more than 5.0% by weight.

Within the framework of this process, one or more embodiments of the thermoplastic polymer material (A), the organic phosphorus-containing compound (B), and the hindered amine (C), as described above, are applicable. The production process according to one or more embodiments of the present invention will be explained in more details hereinafter.

The polymer resin is usually processed into a desired particulate shape so as to make it easier to use in pre-expansion, for example, by melting in extruder, kneader, Banbury mixer or roll mill, and forming into particles having a desired shape, such as sphere, cube, parallelepiped or cylindrical column, and having an average particle size of 0.1 to mm, such as 0.7 to 5 mm. The organic phosphorous-containing compound (B), the hindered amine (C) and optionally other additives, like carbon black and/or powdered activated carbon (PAC), are added to the molten resin in the step of preparing the resin particles.

The process for preparing the thermoplastic polymer pre-expanded particles according to one or more embodiments of the present invention is not particularly limited, and processing steps known to the skilled person in the art are applicable. For example, the pre-expanded particles may be produced by dispersing the thermoplastic polymer resin particles (A) into an aqueous dispersion medium, typically water, in a pressurized vessel to form a dispersion, then impregnating the particles with a blowing agent with stirring, heating the dispersion under pressure to a prescribed expansion temperature, and releasing the dispersion into a low pressure zone to thereby expand the particles.

In order to achieve the expansion, volatile blowing agents are used and can be incorporated by different means. Concerning the chemical nature of the blowing agent, various types of blowing agents are known. One class of applicable blowing agents is hydrocarbons, which can be linear alkanes such as n-butane, n-pentane, n-hexane, or n-heptane, or branched alkanes such as isobutane, or cycloalkanes such as cyclobutane, cyclopentane, or cyclohexane. Halogenated hydrocarbons can also be used as blowing agents, including chlorodifluoromethane, dichloromethane, dichlorofluoromethane, chloroethane, and dichlorotrifluoroethane. It is also possible to use alkanols, such as methanol, ethanol, n-propanol, isopropanol or n-butanol. Ketones are also known as blowing agents, such as 3,3-dimethyl-2-butanone and 4-methyl-2-pentanone. The use of ethers and esters is also known in the art. Blowing agents which are gaseous at room temperature, such as carbon dioxide, air, nitrogen, isobutane or noble gases, may be used. Mixtures of the above-mentioned blowing agents can be used as well. Note that water in the aqueous dispersion medium can also be used as the blowing agents.

The amount of the blowing agent is not particularly limited, and is suitably selected according to a desired degree of expansion of the pre-expanded particles to be produced. However, the blowing agent is generally used in an amount of 5 to 50 parts by weight per 100 parts by weight of the thermoplastic polymer resin particles.

In the preparation of an aqueous dispersion of the thermoplastic polymer particles, a dispersing agent such as calcium tertiary phosphate, basic magnesium carbonate, calcium carbonate or kaolin may be used. A surfactant such as sodium dodecylbenzenesulfonate, sodium n-paraffinsulfonate or sodium α-olefinsulfonate may also be used as a dispersing aid. These may be used alone or in mixtures thereof. The amounts of such dispersing agent and surfactant vary depending upon the kinds thereof, and upon the kind and amount of the thermoplastic polymer particles used. Usually the amount of dispersing agent is from 0.2 to 3 parts by weight per 100 parts by weight of water, and the amount of surfactant is from 0.001 to 0.1 part by weight per 100 parts by weight of water. The polymer particles to be dispersed into an aqueous dispersion medium such as water are generally used in an amount of 20-100 parts by weight per 100 parts by weight of water in order to achieve good dispersion into water.

Usually the thermoplastic polymer particles are introduced into a pressurized vessel with water and a blowing agent to form an aqueous dispersion of the particles, and are impregnated with the blowing agent at an elevated temperature, e.g., a temperature higher than the softening point of the polymer resin used. Depending upon the nature of the thermoplastic polymer material (A), this temperature may be between about 100° C. and 170° C. A pressure under which the mixture is impregrated with the blowing agent may be from 5 bars (gauge pressure) to 50 bars (gauge pressure) (from 0.5 MPa (gauge pressure) to 5 MPa (gauge pressure)). The dispersion of the polymer particles containing a blowing agent is then heated under pressure to an expansion temperature in the pressurized vessel, and then released from the vessel into an atmosphere of lower pressure through an orifice having openings with a diameter of about 2 to 10 mm, thereby expanding the polymer resin particles to give the polymer pre-expanded particles according to one or more embodiments of the present invention. The expansion temperature is generally from 110 to 160° C. The expansion pressure is selected primarily according to the prescribed expansion ratio, and may be from 5 to 50 bars (gauge pressure) (from 0.5 to 5 MPa (gauge pressure)). There is no particular limitation in the pressurized vessel used, as long as it can withstand the pressures and temperatures noted above. A representative vessel is an autoclave type pressure vessel.

In an alternative extrusion-foaming process, the polymer is mixed while melting in an extruder, with a blowing agent which is introduced into the extruder. This mixture can be extruded and pelletized, for example by means of underwater pelletization, in either atmospheric or pressurized conditions. The extruded foams and the obtained product are the polymer pre-expanded particles.

The expanded thermoplastic polymer products according to one or more embodiments of the present invention may further contain various additives (as specified hereinabove) which may be incorporated into the thermoplastic polymer material (A) at various processing steps. For example, it is possible to incorporate additives at the same time as the expansion by the blowing agent in the impregnation process involving suspended granules of polymer. It is also possible to carry out a specific extrusion process to incorporate additives, either simultaneously with or prior to expansion with a blowing agent.

To carry out the process according to one or more embodiments of the present invention, the organic phosphorus-containing compound (B) and the hindered amine (C) may be incorporated into granules of a thermoplastic polymer material (e.g. polyolefin) (A) with melting in an extruder. Following this, the material comprising the thermoplastic polymer material (A), the organic phosphorus-containing compound (B) and the hindered amine (C), and optionally other additives, is extruded and then converted into small pellets. These small pellets are then subjected to an expansion process, at a pressure ranging from about 5 to 50 bars (gauge pressure) (from 0.5 to 5 MPa (gauge pressure)) and at a temperature ranging from about 100 to 170° C.

Suspension aids can be used such as, but not limited to, tricalciumphosphate, magnesium pyrophosphate, metal carbonates and kaolin. Other possible suspension aids include polyvinyl alcohol and sulphonate-based surfactants. These materials facilitate the dispersion of the polyolefin particles in the pressurized vessel.

<8. Foamed Article and Process for Producing the Foamed Article>

One or more embodiments of the present invention also relate to flame retardant foamed articles prepared by in-mold foaming or extrusion-foaming of the flame retardant pre-expanded polymer material disclosed herein.

Known methods may be used for in-mold foaming of the polymer resin pre-expanded particles according to one or more embodiments of the present invention. Examples thereof include (1) a method that directly uses the pre-expanded particles; (2) a method that imparts foaming ability by injecting inorganic gas, such as air, into the pre-expanded articles in advance; and (3) a method that fills a mold with pre-expanded particles in a compressed state.

One example of the method for forming an in-mold foamed article from the polymer resin pre-expanded particles according to one or more embodiments of the present invention includes air-compressing the pre-expanded particles in a pressure vessel in advance to inject air into the particles to thereby impart the foaming ability, filling a mold that can enclose but cannot hermetically seal its interior with the pre-expanded particles, molding the particles with a heating medium such as steam at a heating steam pressure ranging from about 1.5 to 4 bars (gauge pressure) (from 0.15 to 0.4 MPa (gauge pressure)) within a heating time ranging from about 3 to seconds, to cause fusion between the polymer resin pre-expanded particles, cooling the mold with water to a level that can suppress deformation of the in-mold foamed article after the in-mold foamed article is taken out from the mold, and opening the mold to obtain the in-mold foamed article.

The resulting foamed articles show excellent flame resistance or self-extinguishing property, and remarkable mechanical and outstanding cushioning and energy absorption properties in view of their very low density. Therefore they can be suitably used in various fields of industry, for example, in a technical field which requires a flame resistant and non-dripping property, such as the passenger transport industry (e.g. vehicle interior parts, where one or more safety standards such as FMVSS 302, ISO 3795, UN/ECE/324 Reg. 118, EN 45545-2, FAR 25.853, and IMO safety standards may need to be met), the electric and electronic industries (e.g. plastic parts for electric and electronic devices and appliances where one or more safety standards such as UL94, ISO 9772 and ISO 9773 may need to be met), and the building industry (e.g. plastic material elements for heating, ventilation and air-conditioning, like housings for boilers and heating systems, and pipes for ventilation systems, where one or more safety standards such as ISO 11925-2, EN 13823, ISO 1182, ISO 1716, NF 92-501 and DIN 4102 may need to be met). For example, the in-mold foamed articles may be parts used in vehicles, building, construction, furniture, electrical and electronic appliances.

The main advantages according to one or more embodiments of the present invention are the following:

easiness of continuous, semi-continuous or discontinuous operation, easiness to achieve a required level of flame retardancy, a foam having good mechanical properties, cushioning properties and surface appearance, a foam exhibiting good moldability or extrudability, and generating no harmful gases when burning, possibility to recycle a cheap and readily available raw material into a higher value material or shaped article, processing using standard production equipment and procedures, processes requiring little energy consumption.

The present invention is not limited to the description of the above embodiment, and can therefore be modified by a skilled person in the art within the scope of the claims. Namely, an embodiment derived from a proper combination of technical means disclosed in different embodiments is encompassed in the technical scope of the present invention.

Moreover, it is possible to obtain a new technical feature from a proper combination of technical means disclosed in different embodiments.

One or more embodiments of the present invention can also be configured as follows.

(1) A flame retardant pre-expanded polymer material comprising:

(A) a thermoplastic polymer material;

(B) an organic phosphorus-containing compound; and (C) a hindered amine having an OR group substituted directly on its N-atom, wherein R is a saturated or unsaturated hydrocarbyl group;

wherein the phosphorus-containing compound (B) is not a phosphoric ester, a phosphate or a triarylphosphine oxide, and wherein the weight ratio (B)/(C) is from 1.9 to 10.

(2) A flame retardant pre-expanded polymer material according to (1), wherein the weight ratio (A)/{(B)+(C)} is from 3 to 100.

(3) A flame retardant pre-expanded polymer material according to any one of (1) and (2), wherein the organic phosphorus-containing compound (B) is nitrogen-free.

(4) A flame retardant pre-expanded polymer material according to (3), wherein the organic nitrogen-free phosphorus-containing compound (B) is at least one kind selected from the group consisting of organic phosphites; alkyl phosphonic acids and aryl phosphonic acids, and esters thereof; cyclic phosphonates; cyclic bisphosphonates; phosphinates, phosphinites, phosphonites, and salts thereof; and polyol phosphate alcohols.

(5) A flame retardant pre-expanded polymer material according to any one of (1) and (2), wherein the organic phosphorus-containing compound (B) is a nitrogen-containing phosphorus-containing compound.

(6) A flame retardant pre-expanded polymer material according to (5), wherein the organic nitrogen-containing phosphorus-containing compound (B) is at least one kind selected from the group consisting of phosphoramidates, phosphoramidites, phosphonamides, phosphinamides, and organic phosphazenes and salts thereof.

(7) A flame retardant pre-expanded polymer material according to any one of (1) to (6), wherein the organic nitrogen-free phosphorus-containing compound (B) is cyclic bisphosphonates and the hindered amine (C) is triazine-containing hindered amine.

(8) A flame retardant pre-expanded polymer material according to any one of (7), wherein the cyclic bisphosphonates is pentaerythrityl diphosphonates, being represented by the structural formula.

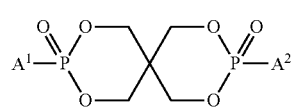

[Chem. 11]

wherein A1 and A2 are independently C1-10 alkyl, C2-10 alkenyl, benzyl, phenylethyl, phenyl or naphthyl, and the triazine-containing hindered amine is N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamines, their pure isomers, and bridged derivatives thereof.

(9) A flame retardant pre-expanded polymer material according to any one of (1) to (8), having a bulk density from 10 kg/m$^3$ to 300 kg/m$^3$, and/or an average cell diameter from 50 to 1,000 μm.

(10) A flame retardant pre-expanded polymer material according to any one of (1) to (9), further comprising from 0.01% to below 0.5% by weight carbon black and/or from 0.5% to 3% by weight powdered activated carbon.

(11) A flame retardant pre-expanded polymer material according to any one of (1) to (10), wherein the thermoplastic polymer material (A) is at least one kind selected from the group consisting of low density polyethylene, high density polyethylene, polypropylene, poly(propylene-co-ethylene), polystyrene, and polycarbonate.

(12) A flame retardant foamed article prepared by in-mold foaming or extrusion-foaming of the flame retardant pre-expanded polymer material according to any one of (1) to (11).

(13) A flame retardant foamed article according to (12), being selected from the group consisting of parts used in vehicles, building, construction, furniture, electrical and electronic appliances.

(14) A process for producing a flame retardant pre-expanded polymer material according to any one of (1) to (11), comprising the steps of:

providing a mixture of a thermoplastic polymer material (A) with an organic phosphorus-containing compound (B) wherein the phosphorus-containing compound (B) is not a phosphoric ester, a phosphate or a triarylphosphine oxide, and with a hindered amine (C) having an OR group substituted directly on the N-atom of the hindered amine, wherein R is a saturated or unsaturated hydrocarbyl group, the weight ratio (B)/(C) being from 1.9 to 10, impregnating said mixture with a volatile blowing agent in an aqueous suspension under high temperature and high pressure conditions, and decompressing the impregnated mixture to atmospheric pressure.

EXAMPLES

The following examples are given for the purpose of explaining and illustrating one or more embodiments of the present invention, as well as illustrating some of its resulting advantages.

Examples 1-8 and Comparative Example 9

A propylene-ethylene random copolymer (ethylene content 2.2% by weight, melt index 8.0 g/10 min) was mixed with an organic phosphorus-containing compound (trademark AFFLAMMIT PCO900 from Thor GmbH) and a hindered amine ether flame retardant (trade mark FLAMSTAB NOR116 from BASF), and carbon black or powdered activated carbon (PAC) in the amounts by weight shown in table 1 below, and nucleating agent, anti-oxidant and UV absorber in amounts such that the combined amounts of all ingredients equal 100% by weight. The median particle size of the PAC used in Example 2, was about 3 μm and its internal surface area was about 1000 $m^2/g$. The resulting mixture was kneaded by a twin-screw extruder and formed into resin particles having a weight of 1.2 mg/particle. The melting point of the obtained resin particles was 150° C.

A 10 liter pressurized vessel was charged with 100 parts by weight of the resin particles, a blowing agent shown in table 1 and a dispersion medium (150 parts by weight of water containing 1.3 parts by weight of powdery basic calcium tertiary phosphate and 0.02 part by weight of sodium n-paraffin sulfonate). The resulting aqueous dispersion was heated to an expansion temperature, and pressurized to an expansion pressure (gauge pressure) by the additional introduction of blowing agent to the vessel, as shown in table 1. A valve provided at a lower part of the pressure vessel was opened and, while maintaining the pressure inside the vessel at that pressure by introducing a nitrogen gas, the aqueous dispersion was released into the atmosphere through an orifice plate having openings of 4.5 mm diameter to give pre-expanded particles. The pre-expanded particles were evaluated. The pre-expanded particles were placed in a pressure vessel and compressed by air pressure, and the compressed particles were filled in a mold having a size of 370×370×60 mm at a compression ratio of at least 10%. The particles were then heated for 20 seconds (for 5 seconds of the 20 seconds, both surfaces of the particles were heated at 3.0 bars (gauge pressure) (0.3 MPa (gauge pressure))) with steam of 1.5 to 3.0 bars (gauge pressure) (0.15 to 0.3 MPa (gauge pressure)) to fuse them together. The obtained in-mold foamed article was evaluated.

Comparative Example 1

A propylene-ethylene random copolymer (ethylene content 2.2% by weight, melt index 8.0 g/10 min) was mixed with carbon black in the amount by weight shown in table 1 below, and nucleating agent, anti-oxidant and UV absorber in amounts such that the combined amounts of all ingredients equal 100% by weight. The resulting mixture was kneaded by a twin-screw extruder and formed into resin particles having a weight of 1.2 mg/particle. The melting point of the obtained resin particles was 150° C.

A 10 liter pressurized vessel was charged with 100 parts by weight of the resin particles, and a dispersion medium (150 parts by weight of water containing 1.0 part by weight of powdery basic calcium tertiary phosphate and 0.02 part by weight of sodium n-paraffin sulfonate). The resulting aqueous dispersion was heated to an expansion temperature, and pressurized to an expansion pressure (gauge pressure) by the introduction of air to the vessel, as shown in table 1. A valve provided at a lower part of the pressure vessel was opened and, while maintaining the pressure inside the vessel at that pressure by introducing a nitrogen gas, the aqueous dispersion was released into the atmosphere through an orifice plate having openings of 4.5 mm diameter to give pre-expanded particles. The pre-expanded particles were evaluated. Subsequently, in-mold foaming was carried out in the same manner as Example 1. The obtained in-mold foamed article was evaluated.

Comparative Examples 2, 7 and 8

A propylene-ethylene random copolymer (ethylene content 2.2% by weight, melt index 8.0 g/10 min) was mixed with a hindered amine ether flame retardant (trade mark FLAMSTAB NOR116 from BASF) and carbon black in the amounts by weight shown in table 1 below, and nucleating agent, anti-oxidant and UV absorber in amounts such that the combined amounts of all ingredients equal 100% by weight. The resulting mixture was kneaded by a twin-screw extruder and formed into resin particles having a weight of 1.2 mg/particle. The melting point of the obtained resin particles was 150° C.

A 10 liter pressurized vessel was charged with 100 parts by weight of the resin particles, and a dispersion medium (300 parts by weight of water containing 1.5 parts by weight of powdery basic calcium tertiary phosphate and 0.03 part by weight of sodium n-paraffin sulfonate), and deaerated. Thereafter, 15 parts by weight of isobutane which was being stirred was poured into the closed vessel. The resulting aqueous dispersion was heated to an expansion temperature shown in table 1, and the pressure inside the vessel was adjusted to a predetermined expansion pressure (gauge pressure) shown in table 1 by the introduction of isobutane to the vessel. A valve provided at a lower part of the pressure vessel was opened and, while maintaining the pressure inside the vessel at that pressure by introducing a nitrogen gas, the aqueous dispersion was released into the atmosphere through an orifice plate having openings of 4.5 mm diameter to give pre-expanded particles. The pre-expanded particles were evaluated. Subsequently, in-mold foaming was carried out in the same manner as Example 1. The obtained in-mold foamed article was evaluated.

Comparative Examples 3-4

A propylene-ethylene random copolymer (ethylene content 2.8% by weight, melt index 6.0 g/10 min, melting point: 145° C.) was mixed with a phosphoric ester (trademark PX-200 (molecular weight: 687, P %: 9.0%) from DAIHACHI CHEMICAL INDUSTRY CO., LTD.) and a hindered amine ether flame retardant (trade mark FLAMSTAB NOR116 from BASF), and carbon black in the amounts by weight shown in table 1 below, and nucleating agent, anti-oxidant and UV absorber in amounts such that the combined amounts of all ingredients equal 100% by weight. The mixture was kneaded by a 50 mm cp single screw extruder, and then granulated into polyolefin-based resin particles (1.2 mg/particle).

PX-200 is expressed by the general formula:

[Chem. 12]

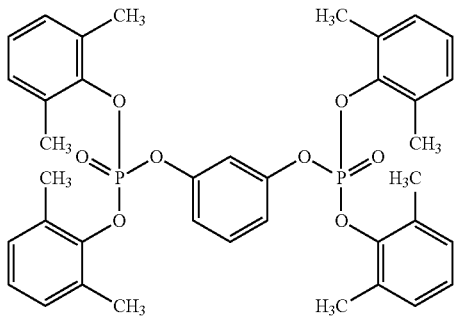

A 10 L closed container was charged with 100 parts by weight of the resin particles thus produced, 10 parts by weight of iso-butane, 300 parts by weight of water, 1.6 parts by weight of powdery calcium tertiary phosphate, and 0.03 parts by weight of sodium n-paraffin sulfonate, and the inside of the closed container was heated to an expansion temperature shown in Table 1. Then, the pressure in the container was adjusted to a predetermined expansion pressure (gauge pressure) shown in Table 1 by injecting iso-butane into the container. Subsequently, while the pressure in the container was maintained with nitrogen, a valve provided on the lower portion of the closed container was opened so that the aqueous dispersion was released into the atmosphere through an orifice plate having openings of 4.0 mm φ diameter, thereby providing polyolefin-based resin pre-expanded particles. The polyolefin-based resin pre-expanded particles were evaluated as described above. Table 1 shows the results.

Next, the polyolefin-based resin pre-expanded particles thus produced were washed with 0.1N hydrochloric acid solution. Moreover, the pre-expanded particles were placed in a pressure vessel and pressurized by air to impart an internal pressure of 2 bars (absolute pressure) (0.2 MPa (absolute pressure)) (to impart the foaming ability). Then, the pre-expanded particles were filled into a mold of 400 mm×300 mm×60 mm, heated for 10 seconds with steam at 2.8 bars (gauge pressure) (0.28 MPa (gauge pressure)) during heating of both surfaces, and fused together to form a polypropylene-based resin in-mold expansion molded article.

The obtained in-mold foamed article was evaluated.

Comparative Examples 5-6

A propylene-ethylene random copolymer (ethylene content 2.1% by weight, melt index 7.1 g/10 min, melting point: 143° C.) was mixed with a triphenyl phosphine oxide (trademark PP-560 (P %: 11.13%) from K.I Chemical Industry Co., Ltd.) and a hindered amine ether flame retardant (trade mark FLAMSTAB NOR116 from BASF), and carbon black in the amounts by weight shown in table 1 below, and polyethylene glycol, nucleating agent, anti-oxidant and UV absorber in amounts such that the combined amounts of all ingredients equal 100% by weight. The resultant mixture was supplied to an extruder, was melted and kneaded at a resin temperature of 210° C., and was extruded with use of a cylindrical die (diameter of 1.8 mm) which was provided at the end of the extruder, then was cooled with water and cut by a cutter, whereby cylindrical polypropylene-based resin particles (1.2 mg/particle) were obtained.

To a 200-L closed vessel, 100 parts by weight of the resultant polypropylene-based resin particles, 200 parts by weight of pure water, 0.6 part by weight of calcium tertiary phosphate, and 0.04 part by weight of sodium n-paraffin sulfonate were poured and deaerated, and 7 parts by weight of carbon dioxide was poured to the closed vessel under stirring. Then the resultant was heated to 150° C. A pressure in the closed vessel at this time was 29 bars (gauge pressure) (2.9 MPa (gauge pressure)).

Immediately, by opening a valve provided at a lower part of the closed vessel, an aqueous dispersion (resin particles and water-based dispersion medium) was discharged through an orifice having a diameter of 3.5 mm into an atmospheric pressure, whereby the pre-expanded particles were obtained. In this case, the pressure was kept by carbon dioxide to prevent the pressure from reducing during the discharge of the aqueous dispersion.

A plate-like polypropylene-based resin in-mold foamed article was obtained with use of a polyolefin expanding molding apparatus P150N (manufactured by Toyo Machinery & Metal Co., Ltd.) as follows; polypropylene resin pre-expanded particles to which 2.0 bars (absolute pressure) (0.2 MPa (absolute pressure)) of internal pressure was imparted by air pressurization in a pressure-resistant vessel were introduced into a plate-shaped mold (length 400 mm×width 300 mm×thickness 60 mm); and polypropylene-based resin pre-expanded particles were heated for 10 seconds to be fused with steam having a pressure of 2.8 bars (gauge pressure) (0.28 MPa (gauge pressure)) during heating of both surfaces.

The obtained in-mold foamed article was evaluated.

The results obtained after evaluation according to the methods specified herein are as shown in table 2 below. Examples 1-8 and Comparative Examples 1-9 show that the incorporation of an organic phosphorus-containing compound (B) and a hindered amine (C) to polymer pre-expanded particles surprisingly improves the fire retardant and non-dripping behaviour of the molded article obtained from the pre-expanded particles.

In Comparative Examples 2, 7 and 8, in which a hindered amine (C) is included but no organic phosphorus-containing compound (B) is included, and in Comparative Example 9 in which an organic phosphorus-containing compound (B) is included but no hindered amine (C) is included, dripping particles occurred, and ignition of cotton was found. A comparison between Comparative Example 7 and Comparative Example 8 shows that, in a case where no organic phosphorus-containing compound (B) is included, even increase in content of the hindered amine (C) cannot preclude the occurrence of the dripping particles. A comparison between Comparative Example 2 and Comparative Example 7 shows that, in a case where the hindered amine (C) is included but no organic phosphorus-containing compound (B) is included, addition of carbon black decreases flame retardancy. In Comparative Example 2 and Example 5, carbon black is included. Comparative Example 2 and Example 5 equal in total amount of flame retardant to each other. In Comparative Example 2, in which the hindered amine (C) is included but no organic phosphorus-containing compound (B) is included, the dripping particles occurred, and the ignition of cotton was found. On the other hand, in Example 5, in which a hindered amine (C) and an organic phosphorus-containing compound (B) are included, flame retardancy is remarkably improved.

Note that, as described above, it was known that a thermoplastic polymer foamed article including a triazine-containing hindered amine ether as a flame retardant additive showed self-extinguishing property but generated dripping particles during burning (see, for example, Patent Literature 5). It is therefore not possible to easily arrive at using a hindered amine (C) on the basis of conventional techniques in order to preclude the occurrence of dripping particles. Use of the hindered amine (C) and an organic phosphorus-containing compound (B) at a specific weight ratio makes it possible to preclude the occurrence of dripping particles. This is a surprising effect unpredictable from the conventional techniques.

Methods of Evaluation

Bulk Density of Pre-Expanded Particles

A container with a volume V1 of 10 liters (L) was filled with dried pre-expanded particles, and the weight W1 (g) of the particles was exactly measured. The bulk density D (g/L) of the pre-expanded particles was calculated according to the following equation: $D = W1/V1 = W1/10$.

Density of In-mold Foamed Articles

The apparent density MD (g/L) of the in-mold foamed article shown in table 2 was calculated by dividing the weight W2 (g) of the foamed article by the volume V2 (L) of the foamed article: $MD = W2/V2$ Burning and Dripping Behaviour The burning and dripping behaviour were measured and evaluated in accordance with the UL94 "Horizontal Burning foamed material test".

10 specimens were cut away from an in-mold foamed article, with sizes of 150±5 mm×50±1 mm×13 mm and leaving the skin layer on the surface of 150 mm×50 mm. Each specimen was marked across its width with three lines, at 25 mm, 60 mm and 125 mm from one end. One set of 5 specimens was preconditioned for minimum 48 hours at 23±2° C. and 50±5% relative humidity until immediately prior to testing. A second set of 5 specimens was preconditioned for 168 hours at 70±2° C. in an oven and then cooled in the desiccator for at least 4 hours at 23±2° C. and 50±5% relative humidity. The latter preconditioning procedure simulated the ageing of the material.

The test setup involved a specimen support wire gauze, held in a support fixture such that the major section was horizontal and 13±1 mm above the tip of the burner wing tip, and 175±25 mm above a horizontal layer of 100 percent absorbent cotton, thinned to approximately 50×50 mm and a maximum thickness of 6 mm. The cotton was located under the front upturned portion of the wire cloth. At the start of the test, a burner with a wing tip, supplied with methane gas, was ignited to produce a blue flame with a height of 38 mm. Next, a specimen was placed horizontally on the support wire gauze with the side having a high density exterior skin facing down. The flame was applied for 60 seconds and was then removed from the specimen.

The following information was recorded during the test, and is presented in Table 2:

(a) After flame time in seconds, being the time when the flaming ceased, after the flame was removed.

(b) Afterglow time in seconds, being the time when the glowing ceased after the flame was removed.

(c) Total distance the specimen burned ($L_b$), in mm, from the end of the specimen where the flame was applied up till the 125 mm mark.

(d) Whether the specimen dripped particles.

(e) Whether or not the dry absorbent cotton placed below the test specimen was ignited by dripping particles.

TABLE 1

| | Thermoplastic polymer (A) | Organic phosphorus Containing compound | | Hindered amine (C) | | Other Additive (D) | | Ratio | Ratio | Expansion conditions | | | | Pre-expanded particles Bulk |
|---|---|---|---|---|---|---|---|---|---|---|---|---|---|---|
| | | | | | | | | | | | Initial blowing | | | |
| | % by weight | Type | % by weight | Type | % by weight | Type | % by weight | Ratio (B)/(C) | (A)/ [(B) + (C)] | Blowing agent | agent (phr) | Temp (° C.) | Pressure (bar) | density (g/L) |
| Ex 1 | 94.9 | Aflammit PC0900 | 2.7 | Flamstab NOR116 | 1.0 | Carbon black | 0.30 | 2.7 | 25.7 | $CO_2$ | 6 | 154.5 | 26.0 | 34 |
| Ex 2 | 93.8 | Aflammit PC0900 | 2.7 | Flamstab NOR116 | 1.0 | PAC | 2.2 | 2.7 | 25.4 | $CO_2$ | 5 | 155.0 | 24.0 | 38 |
| Ex 3 | 95.7 | Aflammit PC0900 | 2.7 | Flamstab NOR116 | 1.0 | — | — | 2.7 | 25.9 | $CO_2$ | 6 | 153.6 | 25.5 | 39 |
| Ex 4 | 96.0 | Aflammit PC0900 | 1.8 | Flamstab NOR116 | 0.2 | Carbon black | 0.38 | 9.0 | 48.0 | $CO_2$ | 7 | 153.0 | 30.0 | 27 |
| Ex 5 | 95.5 | Aflammit PC0900 | 2.7 | Flamstab NOR116 | 0.3 | Carbon black | 0.38 | 9.0 | 31.8 | $CO_2$ | 7 | 153.0 | 30.0 | 28 |

TABLE 1-continued

| | Thermoplastic polymer (A) | Organic phosphorus Containing compound | | Hindered amine (C) | | Other Additive (D) | | Ratio (B)/(C) | Ratio (A)/[(B) + (C)] | Expansion conditions Initial blowing | | | | Pre-expanded particles Bulk density (g/L) |
|---|---|---|---|---|---|---|---|---|---|---|---|---|---|---|
| | % by weight | Type | % by weight | Type | % by weight | Type | % by weight | | | Blowing agent | agent (phr) | Temp (°C.) | Pressure (bar) | |
| Ex 6 | 96.1 | Aflammit PC0900 | 1.8 | Flamstab NOR116 | 0.1 | Carbon black | 0.38 | 18.0 | 50.6 | CO$_2$ | 5 | 155.3 | 24.0 | 30 |
| Ex 7 | 96.6 | Aflammit PC0900 | 1.0 | Flamstab NOR116 | 1.0 | Carbon black | 0.30 | 1.0 | 48.3 | CO$_2$ | 5 | 155.3 | 24.0 | 30 |
| Ex 8 | 94.2 | Aflammit PC0900 | 2.7 | Flamstab NOR116 | 0.3 | Carbon black | 1.50 | 9.0 | 31.4 | CO$_2$ | 5 | 155.4 | 22.0 | 40 |
| Comp. Ex 1 | 96.9 | — | — | — | — | Carbon black | 2.50 | — | — | Air | — | 157.5 | 31.5 | 33 |
| Comp. Ex 2 | 96.3 | — | — | — | 3.00 | Carbon black | 0.38 | — | 32.1 | Iso-butane | 15 | 148.3 | 16.7 | 20 |
| Comp. Ex 3 | 95.1 | PX-200 | 2.7 | Flamstab NOR116 | 1.9 | Carbon black | 0.29 | 1.4 | 20.7 | Iso-butane | 10 | 145.6 | 13.9 | 50 |
| Comp. Ex 4 | 96.1 | PX-200 | 2.7 | Flamstab NOR116 | 1.0 | Carbon black | 0.29 | 2.7 | 26.0 | Iso-butane | 10 | 145.6 | 13.9 | 50 |
| Comp. Ex 5 | 95.2 | PP-560 | 0.95 | Flamstab NOR116 | 0.04 | Carbon black | 3.3 | 23.8 | 96.2 | CO$_2$ | 7 | 150.0 | 29.0 | 29 |
| Comp. Ex 6 | 93.4 | PP-560 | 1.9 | Flamstab NOR116 | 0.66 | Carbon black | 3.3 | 2.9 | 36.5 | CO$_2$ | 7 | 150.0 | 29.0 | 29 |
| Comp. Ex 7 | 96.7 | — | — | Flamstab NOR116 | 3.00 | — | — | — | 32.2 | Iso-butane | 15 | 148.0 | 18.2 | 20 |
| Comp. Ex 8 | 99.2 | — | — | Flamstab NOR116 | 0.50 | — | — | — | 198.4 | Iso-butane | 15 | 144.8 | 18.5 | 20 |
| Comp. Ex 9 | 96.1 | Aflammit PC0900 | 2.7 | — | — | Carbon black | 0.6 | — | 35.6 | CO$_2$ | 6 | 154.0 | 25.5 | 39 |

TABLE 2

| | Specimen conditioned at 23° C./50% RH during 48 hours | | | | | Specimen conditioned at 70° C. during 168 hours | | | | |
|---|---|---|---|---|---|---|---|---|---|---|
| | Density (g/L) | Avg L$_b$ (mm) | Avg After flame time (sec) | Avg After glow time (sec) | # specimen which generated dripping particles | # specimen igniting cotton | Avg L$_b$ (mm) | Avg After flame time (sec) | Avg After glow time (sec) | # specimen which generated dripping particles | # specimen igniting cotton |
| Ex 1 | 48 | 21.4 | 0 | 0 | 0 | 0 | 22.0 | 0 | 0 | 0 | 0 |
| Ex 2 | 40 | 22 | 0 | 0 | 0 | 0 | 22.2 | 0 | 0 | 0 | 0 |
| Ex 3 | 50 | 18.8 | 0 | 0 | 0 | 0 | 22.6 | 0 | 0 | 0 | 0 |
| Ex 4 | 39 | 37.4 | 0 | 0 | 4 | 0 | 34.0 | 0 | 0 | | |
| Ex 5 | 42 | 22.2 | 0 | 0 | 0 | 0 | 21.0 | 0 | 0 | 0 | 0 |
| Ex 6 | 47 | 22.0 | 0 | 0 | 0 | 0 | 25.8 | 0 | 0 | 0 | 0 |
| Ex 7 | 55 | 45.6 | 5.0 | 0 | 5 | 0 | 49.0 | 8.0 | 0 | 5 | 0 |
| Ex 8 | 51 | 21.4 | 0 | 0 | 0 | 0 | 18.4 | 0 | 0 | 0 | 0 |
| COMP. Ex 1 | 45 | 125 | 33.3 | 0 | 5 | 5 | 125 | 39.1 | 0 | 5 | 5 |
| COMP. Ex 2 | 45 | 109 | 42.6 | 0 | 5 | 5 | 113 | 56.4 | 0 | 5 | 5 |
| COMP. Ex 3 | 51 | 20 | 0 | 0 | 4 | 4 | 20 | 0 | 0 | 4 | 4 |
| COMP. Ex 4 | 51 | 20 | 9 | 0 | 4 | 4 | 20 | 0 | 9 | 4 | 4 |
| COMP. Ex 5 | 30 | 35 | 0 | 0 | 5 | 5 | 35 | 0 | 0 | 5 | 5 |
| COMP. Ex 6 | 30 | 35 | 0 | 0 | 4 | 4 | 35 | 0 | 0 | 4 | 4 |
| COMP. Ex 7 | 34 | 75.8 | 8.0 | 0 | 5 | 0 | 103.6 | 30.8 | 0 | 5 | 1 |
| COMP. Ex 8 | 42 | 85.4 | 24.8 | 0 | 5 | 1 | 58.0 | 8.8 | 0 | 5 | 0 |
| COMP. Ex 9 | 56 | 45.4 | 1.2 | 0 | 5 | 5 | 61.4 | 26.8 | 0 | 5 | 5 |

One or more embodiments of the present invention is applicable to, for example, various fields of transportation, buildings, construction, furniture, electrical and electronic appliances, etc., the fields requiring flame retardancy and self-extinguishing property.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A polyolefin-based resin pre-expanded particle comprising:
   a polyolefin-based resin;
   an organic phosphorus-containing compound being nitrogen-free; and
   a hindered amine having an OR group substituted directly on an N-atom where R is a saturated or unsaturated hydrocarbyl group, wherein
   the organic phosphorus-containing compound is a pentaerythrityl diphosphonate represented by the following formula:

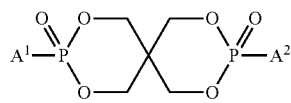

wherein $A^1$ and $A^2$ are independently $C_{1-10}$ alkyl, $C_{2-10}$ alkenyl, benzyl, phenylethyl, phenyl or naphthyl,
   the hindered amine is a triazine-containing hindered amine that contains at least one selected from the group consisting of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine, pure isomers thereof, and bridged derivatives thereof,
   the polyolefin-based resin pre-expanded particle comprises from 1.0% by weight to 10% by weight of the organic phosphorus-containing compound and from 0.1% by weight to 5.0% by weight of the hindered amine,
   the weight ratio of the organic phosphorus-containing compound to the hindered amine is from 1.0 to 20, and
   the weight ratio of the polyolefin-based resin to a total weight of the hindered amine and the organic phosphorus-containing compound is from 22 to 35.

2. The polyolefin-based resin pre-expanded particle according to claim 1, wherein
   the polyolefin-based resin pre-expanded particle comprises from 2.0% by weight to 4.0% by weight of the organic phosphorus-containing compound and from 0.3% by weight to 2.0% by weight of the hindered amine.

3. The polyolefin-based resin pre-expanded particle according to claim 1, wherein
   the polyolefin-based resin pre-expanded particle has a bulk density of from 10 kg/m3 to 300 kg/m3, and/or an average cell diameter of from 50 μm to 1000 μm.

4. The polyolefin-based resin pre-expanded particle according to claim 1, further comprising:
   from 0.01% by weight to 6% by weight of carbon black and/or
   from 0.5% by weight to 3% by weight of powdered activated carbon.

5. The polyolefin-based resin pre-expanded particle according to claim 1, wherein
   the polyolefin-based resin is at least one selected from the group consisting of polypropylene-based resin, low density polyethylene, linear low-density polyethylene, and high density polyethylene.

6. The polyolefin-based resin pre-expanded particle according to claim 5, wherein
   the polypropylene-based resin is at least one selected from the group consisting of homopolypropylene, propylene-ethylene copolymer, and propylene-ethylene-1-butene copolymer.

7. An in-mold foamed article prepared by in-mold foaming of the polyolefin-based resin pre-expanded particle according to claim 1.

8. The in-mold foamed article according to claim 7, wherein
   the in-mold foamed article is selected from the group consisting of parts used in vehicles, building, construction, furniture, electrical and electronic appliances.

9. A process for producing a polyolefin-based resin pre-expanded particle, comprising:
   providing a mixture of a polyolefin-based resin, an organic phosphorus-containing compound being nitrogen-free, and a hindered amine having an OR group substituted directly on an N-atom where R is a saturated or unsaturated hydrocarbyl group;
   impregnating the mixture with a volatile blowing agent in an aqueous dispersion under high temperature and high pressure conditions; and
   decompressing, to atmospheric pressure, the mixture impregnated with the volatile blowing agent, wherein
   the organic phosphorus-containing compound is a pentaerythrityl diphosphonate represented by the following formula:

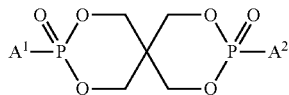

wherein $A^1$ and $A^2$ are independently $C_{1-10}$ alkyl, $C_{2-10}$ alkenyl, benzyl, phenylethyl, phenyl or naphthyl,
   the hindered amine is a triazine-containing hindered amine that contains at least one selected from the group consisting of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine, pure isomers thereof, and bridged derivatives thereof,
   the polyolefin-based resin pre-expanded particle comprises from 1.0% by weight to 10% by weight of the organic phosphorus-containing compound and from 0.1% by weight to 5.0% by weight of the hindered amine,
   the weight ratio of the organic phosphorus-containing compound to the hindered amine is from 1.0 to 20, and
   the weight ratio of the polyolefin-based resin to a total weight of the hindered amine and the organic phosphorus-containing compound is from 22 to 35.

10. A process for producing an in-mold foamed article, the method comprising in-mold foaming a polyolefin-based resin pre-expanded particle, wherein the polyolefin-based resin pre-expanded particle comprises:
a polyolefin-based resin;
an organic phosphorus-containing compound being nitrogen-free; and
a hindered amine having an OR group substituted directly on an N-atom where R is a saturated or unsaturated hydrocarbyl group, wherein
the organic phosphorus-containing compound is a pentaerythrityl diphosphonate represented by the following formula:

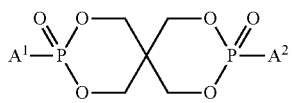

wherein $A^1$ and $A^2$ are independently $C_{1-10}$ alkyl, $C_{2-10}$ alkenyl, benzyl, phenylethyl, phenyl or naphthyl,
the hindered amine is a triazine-containing hindered amine that contains at least one selected from the group consisting of N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine, pure isomers thereof, and bridged derivatives thereof,
the polyolefin-based resin pre-expanded particle comprises from 1.0% by weight to 10% by weight of the organic phosphorus-containing compound and from 0.1% by weight to 5.0% by weight of the hindered amine,
the weight ratio of the organic phosphorus-containing compound to the hindered amine is from 1.0 to 20, and
the weight ratio of the polyolefin-based resin to a total weight of the hindered amine and the organic phosphorus-containing compound is from 22 to 35.

* * * * *